United States Patent [19]

Candiani

[11] 3,798,635

[45] Mar. 19, 1974

[54] CHANNEL MONITOR FOR COMPRESSED-CODE PCM TRANSMISSION SYSTEM

[75] Inventor: Giampiero Candiani, Milan, Italy

[73] Assignee: Societa'Italiana Telecomunicazioni, Siemens S.p.A., Milan, Italy

[22] Filed: May 5, 1972

[21] Appl. No.: 250,725

[30] Foreign Application Priority Data

May 6, 1971 Italy .................................. 24160/71

[52] U.S. Cl. ........................ 340/347 DD, 179/15 BF

[51] Int. Cl. ................................................ H04l 3/00

[58] Field of Search .............. 235/154; 340/347 DD; 179/15 AV, 15 AP, 15 BD, 15 BF, 175.2 C, 15.55; 333/14

[56] References Cited

UNITED STATES PATENTS

| | | | |
|---|---|---|---|
| 3,694,639 | 9/1972 | Deschenes et al. | 340/347 DD X |
| 2,662,175 | 12/1953 | Staal | 179/15 A |
| 3,259,695 | 7/1966 | Murakami | 179/15 BF |

*Primary Examiner*—Thomas J. Sloyan
*Attorney, Agent, or Firm*—Karl F. Ross; Herbert Dubno

[57] ABSTRACT

A transmission path carrying interleaved messages in the form of compressed eight-bit code words is tapped for the selective monitoring of any of its message channels by means of a clock-pulse extractor and an entrance register controlled thereby to store an eight-bit word including a sign bit $Q_s$, three range-indicating bits $a$, $b$, $c$ and a group of four significant bits X, Y, Z, W. This compressed code word is converted, through a logic matrix receiving the stored range bits $a$, $b$, $c$, into an expanded 12-bit word inscribed in an expansion register from which a decoder derives a selectively amplified replica of the original analog signal. The selective amplification is achieved by shifting the bits in the expansion register to denominational positions higher than those indicated by the stored range bits, the multiplication factor (i.e. the number of register stages encompassed by the shift) being established by a digital detector determining the highest amplitude range indicated in the monitored channel during a measuring period.

6 Claims, 7 Drawing Figures

FIG. 4

| $M_1$ | $M_2$ | $M_3$ | $M_4$ | $M_5$ | $M_6$ |
|---|---|---|---|---|---|
| I | 0-15 | $Q_s$0000000XYZW | $Q_s$000XYZW | $Q_s$00000000000-$Q_s$00000001111 | $Q_s$0000000-$Q_s$0001111 |
| II | 16-31 | $Q_s$0000001XYZW | $Q_s$001XYZW | $Q_s$00000010000-$Q_s$00000011111 | $Q_s$0010000-$Q_s$0011111 |
| III | 32-63 | $Q_s$000001XYZW- | $Q_s$010XYZW | $Q_s$0000010000--$Q_s$0000011111- | $Q_s$0100000-$Q_s$0101111 |
| IV | 64-127 | $Q_s$00001XYZW— | $Q_s$011XYZW | $Q_s$000010000—-$Q_s$000011111— | $Q_s$0110000-$Q_s$0111111 |
| V | 128-255 | $Q_s$0001XYZW— | $Q_s$100XYZW | $Q_s$00010000—-$Q_s$00011111— | $Q_s$1000000-$Q_s$1001111 |
| VI | 256-511 | $Q_s$001XYZW— | $Q_s$101XYZW | $Q_s$0010000—-$Q_s$0011111— | $Q_s$1010000-$Q_s$1011111 |
| VII | 512-1023 | $Q_s$01XYZW— | $Q_s$110XYZW | $Q_s$010000—-$Q_s$011111— | $Q_s$1100000-$Q_s$1101111 |
| VIII | 1024-2047 | $Q_s$1XYZW— | $Q_s$111XYZW | $Q_s$10000—-$Q_s$11111— | $Q_s$1110000-$Q_s$1111111 |
| | | B | B′ | | |

FIG. 7

| | $Q_{S1}$ | B | $Q_S$ | A″ | | $Q_6$ | A′ | |
|---|---|---|---|---|---|---|---|---|
| $t_0$ | 1 | 0000000 | 1 | 00000000000.0 | 0 | 1 | 00000000001.0 | + 1 |
| $t_1$ | 1 | 1001000 | 1 | 00011000110.0 | + 196 | 1 | 01100010000.0 | + 784 |
| $t_2$ | 1 | 1010001 | 1 | 00100011000.0 | + 280 | 1 | 10001100000.0 | + 1120 |
| $t_3$ | 1 | 1001000 | 1 | 00011000100.0 | + 196 | 1 | 01100010000.0 | + 784 |
| $t_4$ | 0 | 0000000 | 0 | 00000000000.1 | 0 | 0 | 00000000001.0 | - 1 |
| $t_5$ | 0 | 1001000 | 0 | 00011000100.0 | - 196 | 0 | 01100010000.0 | - 784 |
| $t_6$ | 0 | 1010001 | 0 | 00100011000.0 | - 280 | 0 | 10001100000.0 | - 1120 |
| $t_7$ | 0 | 1001000 | 0 | 00011000100.0 | - 196 | 0 | 01100010000.0 | - 784 |

FIG. 5

| | a | b | c | Operating Mode | $r_1$ | $r_2$ | $r_3$ | $r_4$ | $r_5$ | $r_6$ | $r_7$ | $r_8$ | $r_9$ | $r_{10}$ | $r_{11}$ | $r_{12}$ | $r_{13}$ | $s_1$ | $s_2$ | $s_3$ | $s_4$ | $s_5$ | $s_6$ | $s_7$ | $s_8$ | $s_9$ | $s_{10}$ | $s_{11}$ | $s_{12}$ | $s_{13}$ |
|---|---|---|---|---|---|---|---|---|---|---|---|---|---|---|---|---|---|---|---|---|---|---|---|---|---|---|---|---|---|---|
| $L_{VIII}$ | 1 | 1 | 1 | VIII | 1 | X | Y | Z | W | 1 | 0 | 0 | 0 | 0 | 0 | 0 | 1 | 1 | X | Y | Z | W | 1 | 0 | 0 | 0 | 0 | 0 | 0 | 1 |
| $L_{VII}$ | 1 | 1 | 0 | | 1 | X | Y | Z | W | 1 | 0 | 0 | 0 | 0 | 0 | 1 | 0 | 0 | 1 | X | Y | Z | W | 1 | 0 | 0 | 0 | 0 | 0 | 1 |
| $L_{VI}$ | 1 | 0 | 1 | | 1 | X | Y | Z | W | 1 | 0 | 0 | 0 | 0 | 1 | 0 | 0 | 0 | 0 | 1 | X | Y | Z | W | 1 | 0 | 0 | 0 | 0 | 1 |
| $L_{V}$ | 1 | 0 | 0 | | 1 | X | Y | Z | W | 1 | 0 | 0 | 0 | 1 | 0 | 0 | 0 | 0 | 0 | 0 | 1 | X | Y | Z | W | 1 | 0 | 0 | 0 | 1 |
| $L_{IV}$ | 0 | 1 | 1 | | 1 | X | Y | Z | W | 1 | 0 | 0 | 1 | 0 | 0 | 0 | 0 | 0 | 0 | 0 | 0 | 1 | X | Y | Z | W | 1 | 0 | 0 | 1 |
| $L_{III}$ | 0 | 1 | 0 | | 1 | X | Y | Z | W | 1 | 0 | 1 | 0 | 0 | 0 | 0 | 0 | 0 | 0 | 0 | 0 | 0 | 1 | X | Y | Z | W | 1 | 0 | 1 |
| $L_{II}$ | 0 | 0 | 1 | | 1 | X | Y | Z | W | 0 | 1 | 0 | 0 | 0 | 0 | 0 | 0 | 0 | 0 | 0 | 0 | 0 | 0 | 1 | X | Y | Z | W | 0 | 1 |
| $L_{I}$ | 0 | 0 | 0 | | 0 | X | Y | Z | W | 0 | 1 | 0 | 0 | 0 | 0 | 0 | 0 | 0 | 0 | 0 | 0 | 0 | 0 | 0 | X | Y | Z | W | 0 | 1 |
| $L_{VII}$ | 1 | 1 | 0 | VII | 1 | X | Y | Z | W | 1 | 0 | 0 | 0 | 0 | 0 | 0 | 1 | 1 | X | Y | Z | W | 1 | 0 | 0 | 0 | 0 | 0 | 0 | 1 |
| $L_{VI}$ | 1 | 0 | 1 | | 1 | X | Y | Z | W | 1 | 0 | 0 | 0 | 0 | 0 | 1 | 0 | 0 | 1 | X | Y | Z | W | 1 | 0 | 0 | 0 | 0 | 0 | 1 |
| $L_{V}$ | 1 | 0 | 0 | | 1 | X | Y | Z | W | 1 | 0 | 0 | 0 | 0 | 1 | 0 | 0 | 0 | 0 | 1 | X | Y | Z | W | 1 | 0 | 0 | 0 | 0 | 1 |
| $L_{IV}$ | 0 | 1 | 1 | | 1 | X | Y | Z | W | 1 | 0 | 0 | 0 | 1 | 0 | 0 | 0 | 0 | 0 | 0 | 1 | X | Y | Z | W | 1 | 0 | 0 | 0 | 1 |
| $L_{III}$ | 0 | 1 | 0 | | 1 | X | Y | Z | W | 1 | 0 | 0 | 1 | 0 | 0 | 0 | 0 | 0 | 0 | 0 | 0 | 1 | X | Y | Z | W | 1 | 0 | 0 | 1 |
| $L_{II}$ | 0 | 0 | 1 | | 1 | X | Y | Z | W | 0 | 1 | 1 | 0 | 0 | 0 | 0 | 0 | 0 | 0 | 0 | 0 | 0 | 1 | X | Y | Z | W | 0 | 1 | 1 |
| $L_{I}$ | 0 | 0 | 0 | | 0 | X | Y | Z | W | 0 | 1 | 1 | 0 | 0 | 0 | 0 | 0 | 0 | 0 | 0 | 0 | 0 | 0 | X | Y | Z | W | 0 | 1 | 1 |
| $L_{VI}$ | 1 | 0 | 1 | VI | 1 | X | Y | Z | W | 1 | 0 | 0 | 0 | 0 | 0 | 0 | 1 | 1 | X | Y | Z | W | 1 | 0 | 0 | 0 | 0 | 0 | 0 | 1 |
| $L_{V}$ | 1 | 0 | 0 | | 1 | X | Y | Z | W | 1 | 0 | 0 | 0 | 0 | 0 | 1 | 0 | 0 | 1 | X | Y | Z | W | 1 | 0 | 0 | 0 | 0 | 0 | 1 |
| $L_{IV}$ | 0 | 1 | 1 | | 1 | X | Y | Z | W | 1 | 0 | 0 | 0 | 0 | 1 | 0 | 0 | 0 | 0 | 1 | X | Y | Z | W | 1 | 0 | 0 | 0 | 0 | 1 |
| $L_{III}$ | 0 | 1 | 0 | | 1 | X | Y | Z | W | 1 | 0 | 0 | 0 | 1 | 0 | 0 | 0 | 0 | 0 | 0 | 1 | X | Y | Z | W | 1 | 0 | 0 | 0 | 1 |
| $L_{II}$ | 0 | 0 | 1 | | 1 | X | Y | Z | W | 0 | 1 | 0 | 1 | 0 | 0 | 0 | 0 | 0 | 0 | 0 | 0 | 1 | X | Y | Z | W | 0 | 1 | 0 | 1 |
| $L_{I}$ | 0 | 0 | 0 | | 0 | X | Y | Z | W | 0 | 1 | 0 | 1 | 0 | 0 | 0 | 0 | 0 | 0 | 0 | 0 | 0 | X | Y | Z | W | 0 | 1 | 0 | 1 |
| $L_{V}$ | 1 | 0 | 0 | V | 1 | X | Y | Z | W | 1 | 0 | 0 | 0 | 0 | 0 | 0 | 1 | 1 | X | Y | Z | W | 1 | 0 | 0 | 0 | 0 | 0 | 0 | 1 |
| $L_{IV}$ | 0 | 1 | 1 | | 1 | X | Y | Z | W | 1 | 0 | 0 | 0 | 0 | 0 | 1 | 0 | 0 | 1 | X | Y | Z | W | 1 | 0 | 0 | 0 | 0 | 0 | 1 |
| $L_{III}$ | 0 | 1 | 0 | | 1 | X | Y | Z | W | 1 | 0 | 0 | 0 | 0 | 1 | 0 | 0 | 0 | 0 | 1 | X | Y | Z | W | 1 | 0 | 0 | 0 | 0 | 1 |
| $L_{II}$ | 0 | 0 | 1 | | 1 | X | Y | Z | W | 0 | 1 | 0 | 0 | 1 | 0 | 0 | 0 | 0 | 0 | 0 | 1 | X | Y | Z | W | 0 | 1 | 0 | 0 | 1 |
| $L_{I}$ | 0 | 0 | 0 | | 0 | X | Y | Z | W | 0 | 1 | 0 | 0 | 1 | 0 | 0 | 0 | 0 | 0 | 0 | 0 | X | Y | Z | W | 0 | 1 | 0 | 0 | 1 |
| $L_{IV}$ | 0 | 1 | 1 | IV | 1 | X | Y | Z | W | 1 | 0 | 0 | 0 | 0 | 0 | 0 | 1 | 1 | X | Y | Z | W | 1 | 0 | 0 | 0 | 0 | 0 | 0 | 1 |
| $L_{III}$ | 0 | 1 | 0 | | 1 | X | Y | Z | W | 1 | 0 | 0 | 0 | 0 | 0 | 1 | 0 | 0 | 1 | X | Y | Z | W | 1 | 0 | 0 | 0 | 0 | 0 | 1 |
| $L_{II}$ | 0 | 0 | 1 | | 1 | X | Y | Z | W | 0 | 1 | 0 | 0 | 0 | 1 | 0 | 0 | 0 | 0 | 1 | X | Y | Z | W | 0 | 1 | 0 | 0 | 0 | 1 |
| $L_{I}$ | 0 | 0 | 0 | | 0 | X | Y | Z | W | 0 | 1 | 0 | 0 | 0 | 1 | 0 | 0 | 0 | 0 | 0 | X | Y | Z | W | 0 | 1 | 0 | 0 | 0 | 1 |
| $L_{III}$ | 0 | 1 | 0 | III | 1 | X | Y | Z | W | 1 | 0 | 0 | 0 | 0 | 0 | 0 | 1 | 1 | X | Y | Z | W | 1 | 0 | 0 | 0 | 0 | 0 | 0 | 1 |
| $L_{II}$ | 0 | 0 | 1 | | 1 | X | Y | Z | W | 0 | 1 | 0 | 0 | 0 | 0 | 1 | 0 | 0 | 1 | X | Y | Z | W | 1 | 0 | 0 | 0 | 0 | 0 | 1 |
| $L_{I}$ | 0 | 0 | 0 | | 0 | X | Y | Z | W | 0 | 1 | 0 | 0 | 0 | 0 | 1 | 0 | 0 | 0 | X | Y | Z | W | 1 | 0 | 0 | 0 | 0 | 0 | 1 |
| $L_{II}$ | 0 | 0 | 1 | I+II | 1 | X | Y | Z | W | 0 | 1 | 0 | 0 | 0 | 0 | 0 | 1 | 1 | X | Y | Z | W | 0 | 1 | 0 | 0 | 0 | 0 | 0 | 1 |
| $L_{I}$ | 0 | 0 | 0 | | 0 | X | Y | Z | W | 0 | 1 | 0 | 0 | 0 | 0 | 0 | 1 | 0 | X | Y | Z | W | 0 | 1 | 0 | 0 | 0 | 0 | 0 | 1 |

CHANNEL MONITOR FOR COMPRESSED-CODE PCM TRANSMISSION SYSTEM

My present invention relates to a pulse-code-modulation (PCM) system for the transmission of messages in digital form over a signal path, generally by time-division multiplexing (TDM), so as to accommodate a number of such message channels in interleaved relationship of the bits of their code words. The composite message thus transmitted includes conventional recurrent synchronization signals to facilitate the individual reconstruction of each binary code word, and thereby of the original analog signal, at the receiving end.

In my copending U.S. applications Ser. Nos. 177,325 and 177,307, both filed 2 Sept. 1971, I have disclosed a compressor and an expander for such code words whereby an original code word with a relatively large number of bits is converted into a compressed code word of a reduced number of bits and is subsequently re-expanded to its original length. This reduction in word length is achieved at the expense of only a slight loss of information due to the sacrifice of certain insignificant bits. The remaining bits of the compressed word can be classified as range-indicating bits, significant bits and (in the case of a bipolar analog signal) a sign bit in first position. The number $m$ of range-indicating bits is relatively small, e.g. three in the specific example of a 12-bit original code word given in my above-identified copending applications; with the preservation of four significant bits X, Y, Z and W, the compressed word consists of eight bits including the three range bits $a$, $b$, $c$ and the sign bit $Q_s$. The amplitude range of the original analog signal represented by the unexpanded code word is defined by a numerical value $p$ of the $m$-bit code combination $a$, $b$, $c$ which need not equal its absolute numerical value as expressed in binary terms.

It is frequently desirable to monitor a selected message channel of such a PCM/TDM transmission system in order to ascertain the active or inactive state of that channel and/or to determine its amplitude level. Because of the reduction of the signal-to-noise ratio inherent in the compression of the code words, relatively sophisticated and expensive equipment is needed in order to separate the message signals from accompanying noise, cross-talk, harmonics and the like.

The general object of my present invention is to provide a method of and means for reliably monitoring a selected message channel of such a system with relatively simple circuitry.

A more particular object is to provide a monitoring network designed to limit the dynamic range of the detected signal so as to eliminate the need for adjustable attenuators or variable-gain amplifiers (liable to introduce additional distortion) which would otherwise be needed to afford the necessary sensitivity at low amplitudes while avoiding overload at higher volumes.

These objects are realized, in accordance with the present invention, by re-expanding the compressed code words in a supervisory network in a manner generally similar to that taught in my prior application Ser. No. 177,307 with the difference, however, that the detected signal is subjected to a selective amplification at the digital level by modifying the shift which the significant bits undergo in response to the numerical value of the $m$-bit combination indicating the amplitude range of the original analog signal. Thus, the numerical weight of the group of significant bits is multiplied, in comparison with the original code word, by a factor FM represented by the difference between the number $n'$ of initial zeroes in the original code word, equal to $2^m - p$, and the reduced number $n$ of such zeroes in the re-expanded code word as modified in accordance with the present invention.

This selective amplification involves, in effect, an upshifting of the group of significant bits of a monitored code word, i.e. a joint displacement of these bits in the direction of the higher-ranking denominational orders (conventionally to the left). The extent of this upshift, performed under either manual or automatic control, is determined by the peak signal amplitudes present on the selected channel as given by a stored maximum value $p_{max}$ of the code combination $a$, $b$, $c$ received during a measuring period; if the peak amplitude is low, a large upshift can be tolerated without danger of overloading the circuits, whereas with high peaks the extent of the shift should be correspondingly limited. Thus, the mode of operation of the monitoring network should be adpatable to the prevailing signal level. With manual operation the measuring period can be established, for example, by the brief depression of a push-button while the operator observes an indicator giving a perceptible (e.g. visual) amplitude reading for the analog equivalent of the expanded and modified code word; with automatic control such a measuring interval can be established by a programmer.

According to another feature of my invention, the multiplication factor introduced by the upshift is displayed by a digital indicator which may be under the control of a logic circuit responsive to the range bits $a$, $b$, $c$. This logic circuit also determines the upshift of the significant bits from the position they occupied in the original (uncompressed) code word; with an expansion register of the type disclosed in my application Ser. No. 177,307, in which these significant bits are first entered into relatively high-ranking consecutive stages respectively assigned to them, the upshift can be accomplished by limiting the extent of the downshift (i.e. displacement in the direction of the lower-ranking stages) which they would otherwise undergo in response to the numerical value $p$ of the range-bit combination. If the overall signal level is low, as where the maximum signal amplitude does not rise above the two bottom ranges conveniently represented by bit combinations 000 and 001, a maximum multiplication factor may be introduced by completely suppressing the downshift; in other instances the downshift may encompass a smaller or larger number of register stages, depending on the top amplitude range as measured by the stored peak value $p_{max}$ which defines the mode of operation of the system in terms of the multiplication factor FM.

The clock pulses required to step the expansion register may be derived from a pulse extractor connected to the transmission path to recover the recurrent synchronizing signal; the extracted timing pulses may control a programmer with a plurality of output terminals cyclically energized during corresponding time slots, these terminals being individually connectable to an enabling input of an entrance register by a manually or otherwise operable selector feeding the bits of a desired message channel into that register.

The above and other features of my present invention will be described in greater detail hereinafter with reference to the accompanying drawing in which:

FIG. 4 is a table serving to explain the conversion of an original 12-bit code word into a compressed 8-bit code word in conformity with the teaching of my copending application Ser. No. 177,307;

FIG. 5 is a table serving to explain the re-expansion of a compressed code word pursuant to the present invention;

FIG. 7 is a table giving the numerical values of the samplings used in reconstituting the analog signal of FIG. 6.

Reference will first be made to FIG. 4 which in column $M_1$ lists eight amplitude ranges I – VIII whose numerical limits (in any convenient units, e.g. millivolts) are given in column $M_2$. According to column $M_3$, each of these ranges can be represented by a generalized 12-bit word including a sign bit $Q_s$ followed by an 11-bit sequence B; each of these words contains a significant group of four consecutive bits X, Y, Z, W preceded, in every range except the first one, by a finite bit "1". In each of the lower ranges I – VII, sequence B also includes one or more initial zeroes ahead of the significant group; in ranges III – VIII, the significant group is followed by one or more insignificant bits symbolized by dashes.

Column $M_4$ shows the compressed code words derived from the original words of column $M_3$, these compressed words being headed by the sign bit $Q_s$ preceding a 7-bit sequence B'. This sequence B' consists of a three-bit code group, varying from "000" to "111", and of the four significant bits X, Y, Z, W of the original sequence B. Column $M_5$ gives the lowest and highest binary values for the generalized code words of column $M_3$; column $M_6$ does the same for the generalized code words of column $M_4$.

It will be noted that the three first bits *a*, *b*, *c* of sequence B' are the binary equivalent of the range classification appearing in column $M_1$. It will also be apparent that the compressed words of column $M_4$ contain all the information of the original words in column $M_3$ with the exception of that conveyed by the insignificant bits.

The table of FIG. 4 is identical with those disclosed in corresponding Figures of my copending applications Ser. Nos. 177,307 and 177,325.

Figure 1:
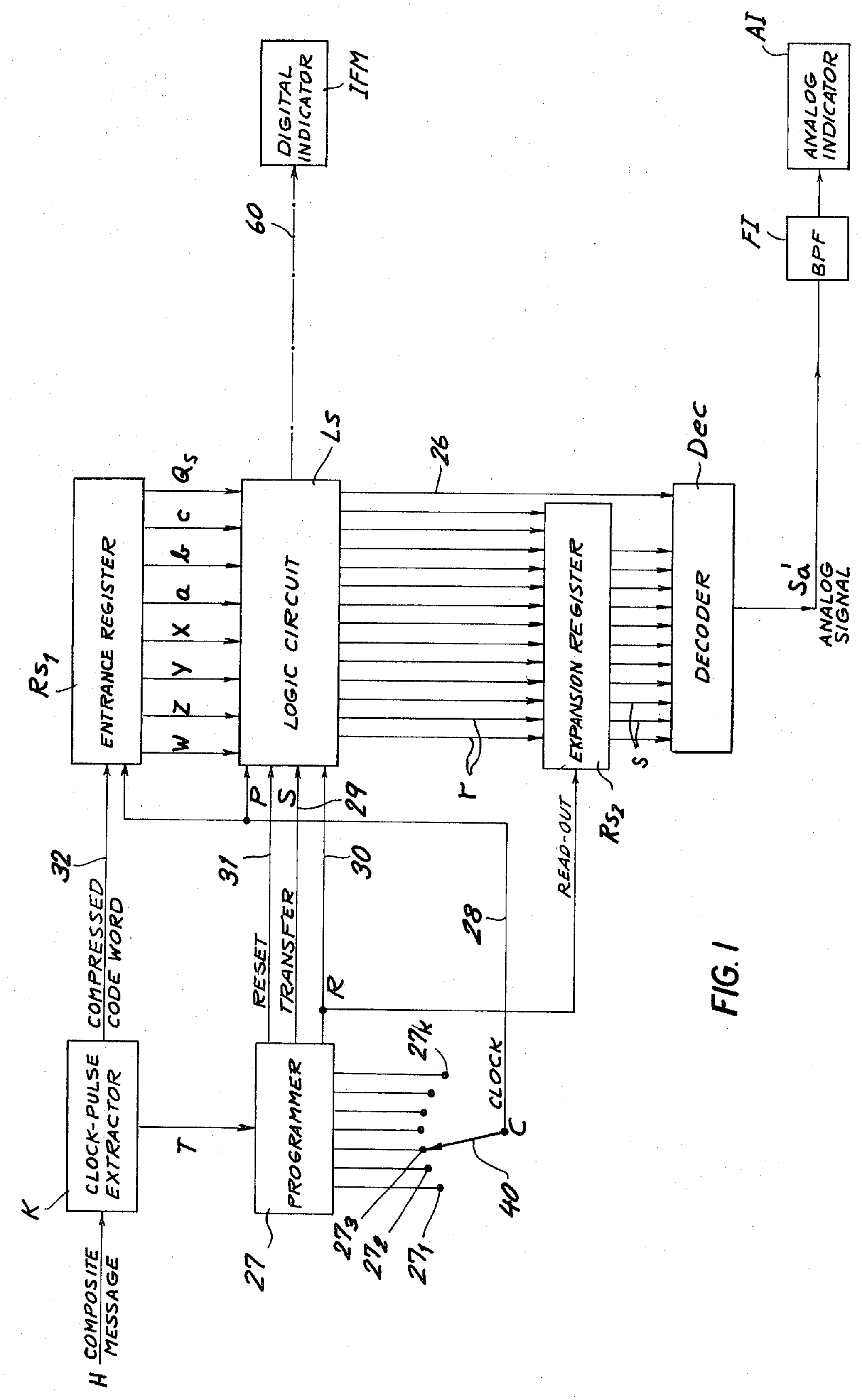
FIG. 1 is a block diagram of a supervisory network for monitoring a PCM message channel in accordance with the invention.

In FIG. 1 I have shown a clock-pulse extractor K which receives from a PCM/TDM transmission path, not further illustrated, a composite message H including a recurrent synchronizing code as well as a number of interleaved compressed code words each consisting of a sign bit $Q_s$ and a seven-bit sequence B' as shown in column $M_4$ of FIG. 4. Extractor K derives from the synchronizing signals a train of timing pulses T controlling a programmer 27 with a number of output terminals $27_1$, $27_2$, $27_3$, . . . $27_k$ which are repeatedly energized in successive time slots of eight consecutive cycles during the interval between consecutive pulses T so as to carry interleaved trains of clock pulses C which can be picked up by a selector switch 40 (here assumed to be manually operated) connected via a lead 28 to an enabling input of an eight-stage entrance register $Rs_1$. This register also receives at 32 the compressed code words of composite message H; with switch 40 set on a selected bank contact such as terminal $27_3$, input register $Rs_1$ is serially loaded with the bits of a compressed code word from a single channel, here the third channel of a total number of k channels. Timing pulse T also marks the beginning or end of a programming period in which a complete eight-bit word is thus registered.

The occurrence of timing pulse T discharges the contents of entrance register $Rs_1$, in parallel, into a logic circuit Ls more fully described hereinafter with reference to FIGS. 2 and 3. Circuit Ls receives from programmer 27, via respective leads 29, 30 and 31, transfer pulses S, clearing or read-out pulses R and resetting pulses P. Read-out pulses R are also transmitted to a 13-stage expansion register $Rs_2$ which receives, over a multiplicity of leads collectively designated *r* in FIG. 1, the significant bits X, Y, Z and W from entrance register $Rs_1$ and additional bits selectively inscribed in certain of its stages by circuit Ls. In response to pulses R, register $Rs_2$ is read out in parallel (except for the two final stages thereof) to eleven stages of a 12-stage decoder Dec by way of a set of leads collectively designated *s* in FIG. 1; a further lead 26, bypassing the register $Rs_2$, directly carries the sign bit $Q_s$ from terminal stage of register $Rs_1$ to a corresponding stage of decoder Dec. In the event that only the magnitude but not the polarity of the monitored signals is of interest, this sign bit may be completely suppressed.

Decoder Dec generates an analog output $S'_a$ which, upon being smoothed in a band-pass filter FI, is a substantial replica of the original analog signal from which it differs, on the one hand, by the loss of information carried in the suppressed insignificant bits and, on the other hand, by a selective magnification which is high in the case of low original signal levels and vice versa. Thus, the dynamic amplitude range of this reconstituted signal is sufficiently limited to allow its direct transmission, without intervening selective attenuation or amplification, to an analog indicator AI giving a reading of its amplitude. Indicator AI may comprise an *a-c* wattmeter, a loudspeaker, an oscilloscope or the like.

Logic circuit Ls also feeds, by way of a cable 60, a digital indicator IFM which displays the multiplication factor introduced in expansion register $Rs_2$ by the logic circuit Ls as more fully described hereinafter. From these two readings the operator can readily determine the current level of activity of the monitored channel.

Figure 2:
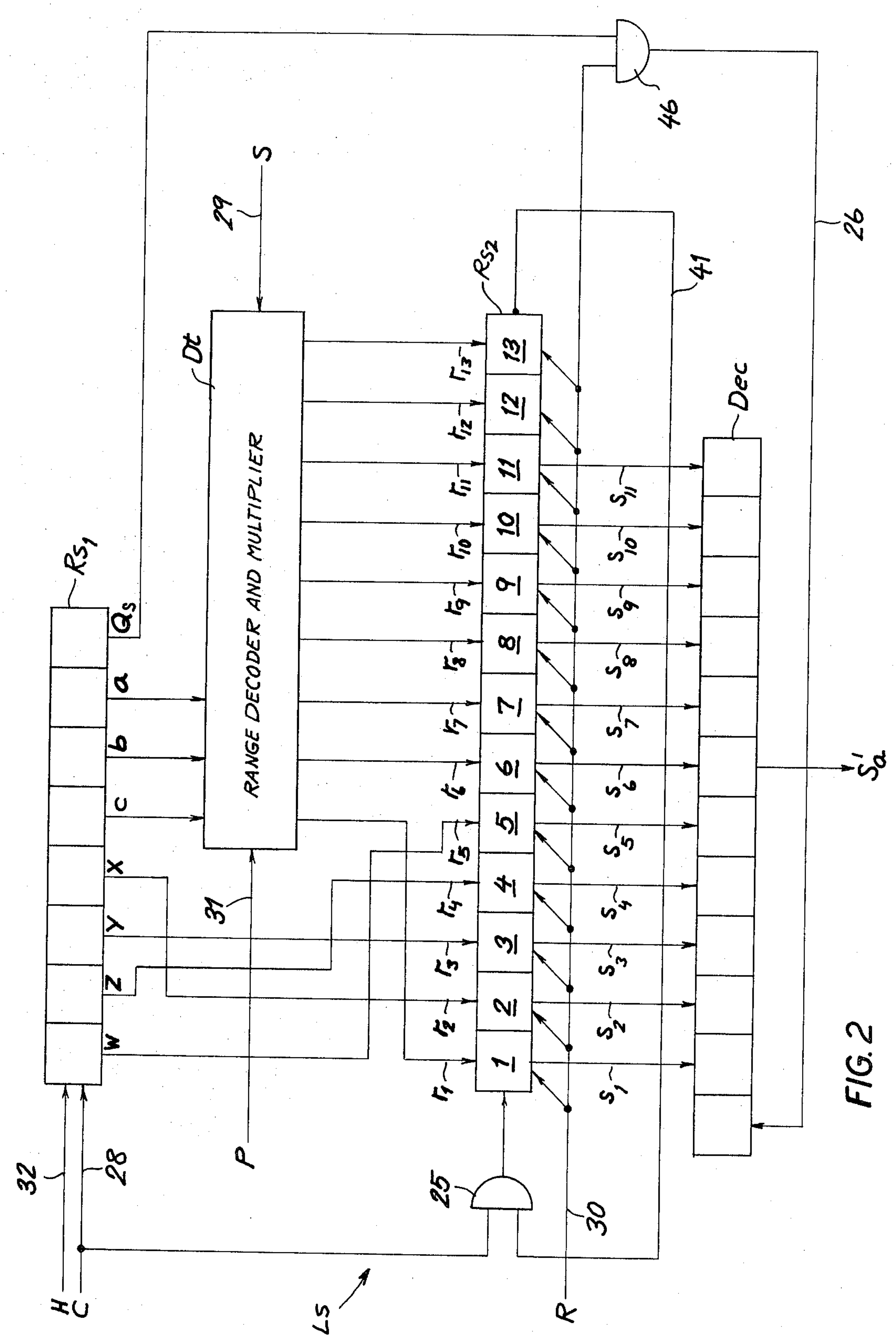
FIG. 2 is a more detailed circuit diagram of a component of the network shown in FIG. 1.

FIG. 2 shows details of logic circuit Ls together with its associated shift registers $Rs_1$, $Rs_2$ and decoder Dec. The eight stages of register $Rs_1$, counting from right to left, contain the sign bit $Q_s$, the range bits *a*, *b*, *c* and the significant bits X, Y, Z, W. The stages of register $Rs_2$ have been numbered 1 through 13, in ascending order from left to right; the corresponding input leads to these stages have been designated $r_1 - r_{13}$, the output leads of stages 1 through 11 being correspondingly labeled $s_1 - s_{11}$. The final stage 14 has an output lead 41 terminating at one input of an AND gate 25 whose other input is tied to lead 28 for periodic energization by the clock pulses C. Lead 30, carrying the read-out pulse R, is connected to all the stages of register $Rs_2$ and also extends to an input of an AND gate 46 having another input fed by the last stage of register $Rs_1$ to receive the sign bit $Q_s$ therefrom; AND gate 46 works through lead 26 into the extreme left-hand stage of decoder Dec which is not connected to any stage of register $Rs_2$.

Figure 3:
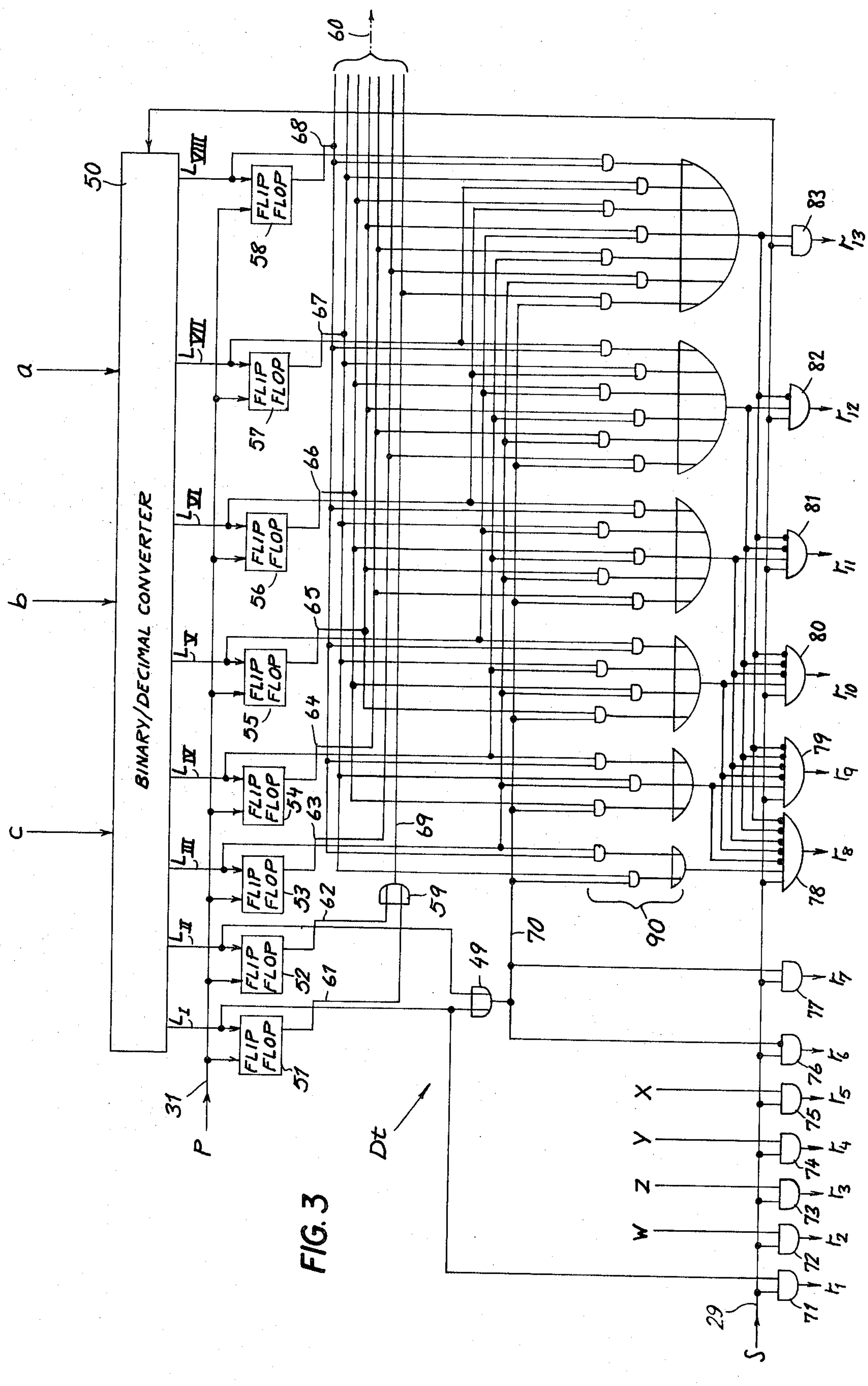
FIG. 3 shows details of a logic matrix included in the component of FIG. 2.

Leads 29 and 31, carrying the transfer pulse S and the resetting pulse P, extend to a range decoder and multiplier Dt shown in detail in FIG. 3. As described in my prior application Ser. No. 177,307, read-out pulse R coincides with the final clock pulse C of an eight-cycle period which completes the loading of register $Rs_1$ with the final bit (W) of the compressed code word. Transfer pulse S is generated immediately thereafter, before the occurrence of the next clock pulse C which introduces the first bit ($Q_s$) of the next code word into register $Rs_1$.

As shown in FIG. 3, the decoder and multiplier Dt includes a binary/decimal converter 50 to which the bits $a$, $b$, $c$ are fed from register $Rs_1$. This converter has eight output leads labeled $L_I - L_{VIII}$, the Roman numerals of the subscripts corresponding to the range designations in column $M_1$ in FIG. 4. Thus, lead $L_I$ carries voltage if all three bits $a$, $b$, $c$ have the logical value "0" indicating the lowest amplitude range I; if each of these bits has the logical value "1", lead $L_{VIII}$ is energized to indicate the highest amplitude range VIII. These leads terminate at the setting inputs of respective flip-flops 51 – 58 whose resetting inputs are tied to lead 31 carrying the pulse P. The set outputs of flip-flops 51 – 58 are connected to respective conductors 61 – 68, conductors 61 and 62 being joined through an OR gate 59 to a conductor 69; extensions of conductors 63 – 69 are combined into the cable 60 leading to the digital indicator IFM of FIG. 1 which may comprise, for example, a display panel with a set of lamps lit upon the energization of any of these conductors to indicate the numerical value $p$ assigned to the bit combination $a$, $b$, $c$ as stored in any of the flip-flops between resetting pulses P. The spacing of these resetting pulses should be sufficient to allow for reception of at least one full cycle of the lowest signaling frequency to be monitored; their recurrence rate may therefore be on the order of ten pulses or less per second. As will be apparent, the highest-ranking flip-flop set during a measuring interval between consecutive pulses P stores the maximum $p_{max}$ of the numerical values $p$ assigned to the several amplitude ranges I – VIII. Thus, for example, if the largest amplitude of the sampled analog signal has a magnitude in range VI, the resulting bit combination 101 causes the energization of lead $L_{VI}$ so that flip-flop 56 is set, applying voltage to conductor 66 and lighting the corresponding lamp of indicator IFM; the operator, on observing the indicator IFM, will take note only of the highest-ranking lamp in ascertaining this peak value.

It may be pointed out parenthetically that the numerical value $p$ here discussed exceeds by 1 the absolute numerical value of the three-bit combination $a$, $b$, $c$ which in the foregoing example (101) has the decimal equivalent 5. This differs from the notation used in my above-identified prior applications in which p was equated to that absolute value.

Leads $L_I$ and $L_{II}$, merging through an OR gate 49 into a lead 70, are connected along with leads $L_{III} - L_{VIII}$ and conductors 63 – 69 to a set of AND gates 71 – 83 by way of a matrix 90 consisting of additional AND and OR gates. AND gates 71 – 83 work into the respective stage inputs $r_1 - r_{13}$ of expansion register $Rs_2$ and are provided, in part, with inverting inputs preventing conduction of more than one gate $r_8 - r_{13}$ at a time. Gate 71 conducts only in the de-energized state of lead $L_I$; if either of leads $L_I$ and $L_{II}$ is energized, gate 76 is cut off whereas gate 77 is turned on.

The table of FIG. 5 summarizes the modes of operation of the circuitry shown in FIG. 3 in the presence of different peak values $p_{max}$ stored on flip-flops 51 – 58. This table shows in its first column the energized leads $L_I - L_{VIII}$, in its second column the bit combinations $a$, $b$, $c$, in its third column the stored values (in Roman numerals) of $p_{max}$ defining the various modes, in its fourth column the contents of expansion register $Rs_2$ immediately upon its loading by the transfer pulse S which unblocks all the AND gates 71 – 83, and in its fifth column the downshifted position of the bits loaded into that register.

As can be seen from FIG. 5, the logic circuit Ls operates in mode VIII essentially in the same manner as the corresponding circuit of my prior application Ser. No. 177,307, except that the starting position of the significant group X, Y, Z, W in register $Rs_2$ is different for the lower amplitude ranges I – IV and that the marking bit "1" following that significant group is separated by a "0" from that group in the two lowest ranges I and II. The final position of the significant bits X, Y, Z, W, an immediately preceding "1" (in ranges II – VIII) and an immediately following "1" (in ranges III - VIII) are identical with those of the re-expanded code word according to the prior application. The bracketing of the last two bits in the right-hand column of FIG. 5 indicates that these bits are entered in register stages 12 and 13 from which they cannot be transferred to decoder Dec.

If flip-flop 58 is not set, i.e. if the amplitudes sampled during a measuring period do not reach into the highest range VIII, the marking bits introduced into the register $Rs_2$ by the energization of leads $r_8 - r_{13}$ are shifted to the right by a number of positions increasing progressively from mode VII through modes I and II; in this specific example, the two lowest modes I and II call for identical shifts. Thus, for instance, a range-bit combination 010 ($p = 3$) energizes the lead $r_8$ in mode VIII ($p_{max} = 8$) but causes the energization of leads $r_9 - r_{13}$ in successive lower modes ($p_{max} = 7, 6, ...3$). This shifting of the marking bit corresponds to a progressively smaller number of zeroes ahead of the leading "1" which precedes the significant bits X, Y, Z, W; the difference between the number $n$ of such zeroes in the normally expanded word (mode VIII) and their number $n'$ in the modified code word represents the multiplication factor FM introduced in accordance with this invention by the logic of FIG. 3. Since factor FM is directly related to the stored value $p_{max}$ as represented by the setting of the highest-ranking flip-flop 51–58, that factor can be instantly determined by the observation of digital indicator IFM. Thus, FM = 1 for $p_{max} = 8$ (conductor 68 energized), FM = 2 for $p_{max} = 7$ (conductor 67 energized), and so on. In order to ascertain the true signal amplitude the operator need only divide the amplitude level given by indicator AI by the factor FM as displayed by indicator IFM.

The introduction of an additional finite or unit bit "1" in stage 6 of register $Rs_2$, in operating modes III – VII, is designed to provide a mean analog value for the truncated code combination in which the insignificant terminal bits of the original code word have been suppressed, as explained in my prior application Ser. No. 177,307. In modes I and II this additional bit is shifted one position to the right and, at high signal levels (mode VIII), doubles as the marking bit. If desired, stage 12 and possibly stage 13 of the register $Rs_2$ could be connected to an additional stage or pair of stages of decoder Dec to give fractional binary readings of numerical values ½ and ¼, respectively.

Figure 6:
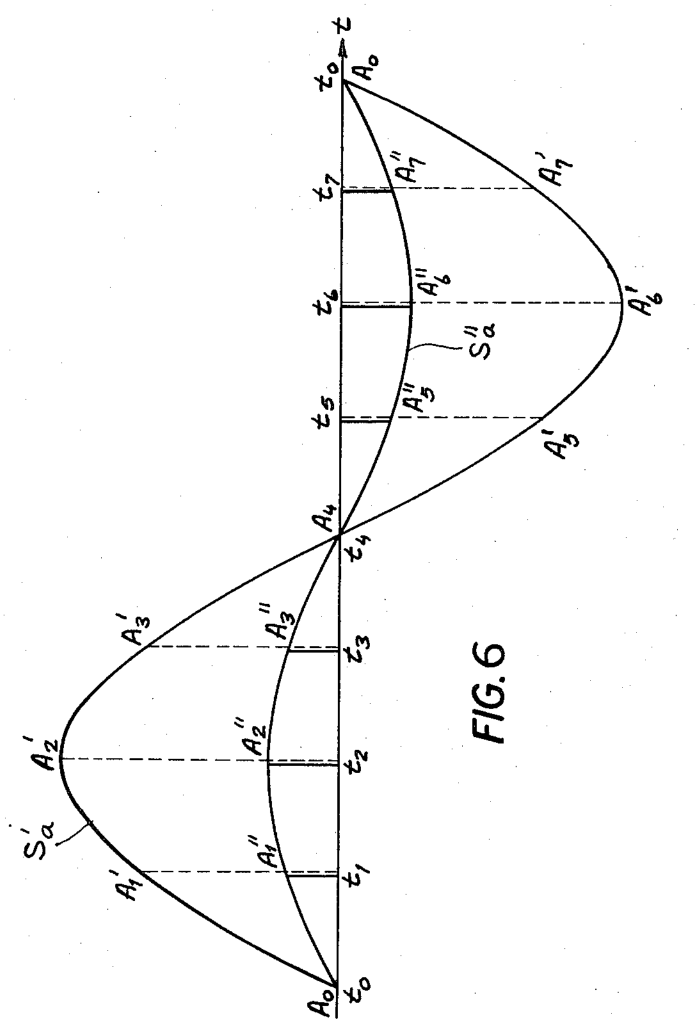
FIG. 6 is a graph of a reconstituted analog signal as obtained by an expander according to my application Ser. No. 177,307 and as amplified in accordance with the present invention.

In FIG. 6 I have shown at $S'_a$ a reconstituted analog signal, as obtained from filter FI, in the form of a sine wave produced from samplings taken at intervals $\pi/4$, i.e. of 125 $\mu$sec (thus at the rate of 8 kHz) if the frequency of the sinusoid is 1 kHz. In the assumption that the system operates in mode VI, i.e. with flip-flop 56 the highest-ranking one set, the multiplication factor FM is 4 so that the amplitudes $A_o$, $A_1'$, $A_2'$..$A_7'$ are four times as large as the corresponding amplitudes $A_o$, $A_1''$, $A_2''$...$A_7''$ of the unmodified analog signal $S''_a$ which would issue if the system operated in the unmodified mode. FIG. 7 shows these amplitude values for the time slots $t_o$, $t_1$, $t_2$... $t_7$, together with compressed code word $Q_s$, B represented in binary and decimal form at A' and A''.

The shifting of the contents of register $Rs_2$ occurs essentially in the manner described in my application Ser. No. 177,307.

Thus, the occurrence of a transfer pulse S on lead 29 opens the AND gates 71 – 83 so that register $Rs_2$ is loaded in parallel with a leading bit "1" (except in the bottom range characterized by the energization of lead $L_I$), significant bits X, Y, Z, W, and one or two further unity bits following this group. As long as stage 13 does not receive such a unity bit, its inverting output opens the AND gate 25 to the next clock pulse C so that all the bits in the register are downshifted by one stage, i.e. the numerical weight of the significant group and any accompanying unity bit is halved. This downshifting continues during successive clock pulse C until a marking bit occupies the stage 13 whereupon the gate 25 is blocked. Readout pulse R then transfers the contents of register $Rs_2$ together with sign bit $Q_s$ from register $Rs_1$ to decoder Dec; as explained in my copending application, the fact that the sign bit actually pertains to the next code word is generally immaterial since the polarity of the monitored signals changes only at relatively long intervals.

If desired, the selector switch 40 of FIG. 1 may be incorporated into the programmer 27 so as automatically to energize the terminals $27_1$, $27_2$ etc. during successive measuring periods each lasting for a sufficient number of clock cycles to register the signal intensity at the lowest frequencies of interest.

I claim:

1. A supervisory network for monitoring a message channel of a pulse-code-modulation system in which messages are transmitted over a signal path in the form of compressed code words each derived from an original code word with a predetermined larger number of bits, each compressed code word including a group of significant bits preceded by an $m$-bit combination with a predetermined numerical value p identifying one of several amplitude ranges of an analog signal represented by said original code word, $m$ being greater than 1, comprising:

an entrance register with a number of stages sufficient to accommodate the $m$ bits of said combination and said significant bits;

input means for repeatedly loading said entrance register with a code word from said channel during a predetermined measuring period;

an expansion register with a larger number of stages than said entrance register;

circuitry between said registers for transferring said group of significant bits from respective stages of said entrance register to consecutive stages of said expansion register;

logic means with input connections to stages of said entrance register accommodating said $m$ bits, said logic means controlling said circuitry for directing said significant bits to stages of said expansion register of a higher rank than corresponds to the numerical value p of said $m$-bit combination, with resulting multiplication of the numerical weight of said group of significant bits as compared with said original code word, said logic means including storage means for a value $p_{max}$ representing the maximum of said numerical value $p$ established during said measuring period, said circuitry being responsive to the stored maximum value $p_{max}$ for modifying the ranks of the stages assigned to said significant bits in said expansion register to vary the factor of multiplication of said numerical weight generally inversely with said maximum value $p_{max}$;

decoding means connected to said expansion register for producing a substantial replica of said analog signal; and indicator means connected to said decoding means for ascertaining the amplitude of said replica.

2. A network as defined in claim 1, further comprising digital indicating means connected to said storage means for displaying said multiplication factor.

3. A network as defined in claim 1 wherein said logic means comprises a gating matrix for introducing a marking bit into a stage of said expansion register determined by said numerical value p and by said maximum value $p_{max}$, said expansion register being provided with stepping means for shifting said group of significant bits therein from a sequence of originally assigned stages to an extent limited by the position of said marking bit.

4. A network as defined in claim 3 wherein said marking bit has the logical value of unity, said gating matrix being responsive to the presence of at least one true signal in said input connections for introducing another unity bit into a stage of said expansion register immediately preceding the stages occupied by said significant bits.

5. A network as defined in claim 3 wherein said stepping means comprises a source of clock pulses connected to said signal path for extracting a synchronizing signal therefrom, said clock pulses being operative to shift the contents of said expansion register step by step toward the last stage thereof, and feedback means connected to said last stage for blocking said clock pulses upon arrival of said marking bit in said last stage.

6. A network as defined in claim 5 wherein the message channel to be monitored is part of a time-divisionmultiplex channel group whose code words are transmitted over said signal path in respective time slots, said source having a plurality of terminals energized in cyclic succession during corresponding time slots, said input means comprising selector means connectable to any one of said terminals for enabling said entrance register to receive the bits of a desired message channel.

* * * * *